US012488973B2

(12) United States Patent
Sultana et al.

(10) Patent No.: US 12,488,973 B2
(45) Date of Patent: Dec. 2, 2025

(54) FLOW CONTROL DEVICE

(71) Applicant: GLASS EXPANSION PTY. LIMITED, Port Melbourne (AU)

(72) Inventors: David Sultana, Port Melbourne (AU); Danny Brezni, Port Melbourne (AU); Terrance Hettipathirana, Port Melbourne (AU); Bill Farrell, Port Melbourne (AU); Anthony Le Breton, Port Melbourne (AU)

(73) Assignee: GLASS EXPANSION PTY. LIMITED, Port Melbourne (AU)

( * ) Notice: Subject to any disclaimer, the term of this patent is extended or adjusted under 35 U.S.C. 154(b) by 330 days.

(21) Appl. No.: 18/297,303

(22) Filed: Apr. 7, 2023

(65) Prior Publication Data

US 2023/0335385 A1 Oct. 19, 2023

(30) Foreign Application Priority Data

Apr. 8, 2022 (AU) ................................ 2022900927

(51) Int. Cl.
*H01J 49/04* (2006.01)
*H01J 49/10* (2006.01)

(52) U.S. Cl.
CPC .......... *H01J 49/045* (2013.01); *H01J 49/105* (2013.01)

(58) Field of Classification Search
CPC .... H01J 49/045; H01J 49/105; H01J 49/0404; H01J 49/0445; H01J 49/167
See application file for complete search history.

(56) References Cited

U.S. PATENT DOCUMENTS

| | | | |
|---|---|---|---|
| 5,969,352 A | 10/1999 | French et al. | |
| 6,207,955 B1 | 3/2001 | Wells et al. | |

(Continued)

FOREIGN PATENT DOCUMENTS

| | | | |
|---|---|---|---|
| CN | 110112051 A * | 8/2019 | ............. H01J 49/04 |
| WO | WO 2013/117985 A1 | 8/2013 | |

OTHER PUBLICATIONS

Australian Search Report dated Dec. 22, 2022 in Australian Application No. 2022900927, 23 pages.

(Continued)

*Primary Examiner* — David E Smith
(74) *Attorney, Agent, or Firm* — Knobbe, Martens, Olson & Bear, LLp

(57) ABSTRACT

A flow control device for aerosolised sample delivery in an inductively coupled plasma (ICP) analytical system is provided. The device includes a body that at least in part defines a sample flow separating region, the sample flow separating region having a longitudinal flow direction and having an upstream end through which the aerosolised sample enters and a downstream end through which a modified aerosolised sample exits. The body further includes an injection duct having an opening adjacent to the sample flow separating region, the injection duct configured to direct a stream of gas in an injection direction to the sample flow separating region. The injection direction is angled relative to the longitudinal flow direction such that, upon introduction of the stream of gas through the opening, a vortex flow is generated in the sample flow separating region, the vortex flow having a direction counter to the direction of flow of the aerosolised sample to provide control of droplet size in the modified aerosolised sample.

20 Claims, 11 Drawing Sheets

(56) References Cited

U.S. PATENT DOCUMENTS

| | | | |
|---|---|---|---|
| 10,327,319 | B1 | 6/2019 | Morrisroe |
| 2011/0056918 | A1 | 3/2011 | Brezni et al. |
| 2014/0084154 | A1 | 3/2014 | Bazhenov et al. |
| 2017/0338092 | A1* | 11/2017 | Stephan ................ H01J 49/107 |
| 2020/0078806 | A1* | 3/2020 | Mizuno ............... H01J 49/0445 |
| 2021/0404968 | A1* | 12/2021 | Loboda .................... H05H 1/30 |

OTHER PUBLICATIONS

Burgener, J.A., 'A brief history of ICP & ICP/MS Nebulizers', Viewed on and retrieved from the Internet on Mar. 29, 2023, <URL: https://burgenerresearch.com/NebulizerHistory2013.pdf> published Feb. 28, 2017 as per Wayback Machine.
Extended European Search Report (EESR) dated Sep. 1, 2023, European Application No. 23167160.3, 10 pages.
Misiulia, Dzmitry et al., "Effects of the inlet angle on the flow pattern and pressure drop of a cyclone with helical-roof inlet," Chemical Engineering Research and Design, 2015, vol. 102, pp. 307-321.
Australian Examination Report No. 1 received for Australian Patent Application No. 2023202154 as mailed Jul. 28, 2025 in 4 pages.
Japanese Office Action received for JP Patent Application No. JP 2023-062953 as mailed Jul. 16, 2025 in 4 pages, with English Translation.

* cited by examiner

| | | | | | | | | | | | |
|---|---|---|---|---|---|---|---|---|---|---|---|
| 0.1 mm diameter | 21.217 | 106.083 | 212.167 | 318.250 | | | | | | | |
| 0.2 mm diameter | | 26.521 | 53.042 | 79.563 | 106.083 | 132.604 | 159.125 | 185.646 | 212.167 | 238.688 | 265.208 |
| 0.3 mm diameter | | 11.787 | 23.574 | 35.361 | 47.148 | 58.935 | 70.722 | 82.509 | 94.296 | 106.083 | 117.870 |
| 0.4 mm diameter | | 6.630 | 13.260 | 19.891 | 26.521 | 33.151 | 39.781 | 46.411 | 53.042 | 59.672 | 66.302 |
| 0.5 mm diameter | | 4.243 | 8.487 | 12.730 | 16.973 | 21.217 | 25.460 | 29.703 | 33.947 | 38.190 | 42.433 |

FLOW CONTROL DEVICE

INCORPORATION BY REFERENCE TO ANY PRIORITY APPLICATIONS

Any and all applications for which a foreign or domestic priority claim is identified in the Application Data Sheet or Request as filed with the present application are hereby incorporated by reference under 37 CFR 1.57, and Rules 4.18 and 20.6, such as Australian Patent Application No. AU2022900927, entitled "A FLOW CONTROL DEVICE" and filed Apr. 8, 2022.

FIELD OF THE INVENTION

The present invention relates to a flow control device, in particular to a droplet separation device for use in Inductively Couple Plasma (ICP) analytical systems for performing mass spectrometry (MS) or optical emission spectroscopy (OES).

BACKGROUND OF THE INVENTION

With current radio frequency generator design in inductively coupled plasma mass spectrometry (ICP-MS) or inductively couple plasma optical emission spectroscopy (ICP-OES), argon plasma is generally tolerant to an aerosol loading rate of about 20 to 50 μL/min and droplets of less than about 10 μm in size before the plasma becomes unstable or is extinguished entirely. A spray chamber is often used in the sample introduction stage of an ICP-MS or ICP-OES system and the transport efficiency is typically less than 5%, i.e. less than 5% of the sample aerosol is transported to the plasma. Therefore, the typical uptake rate of a liquid sample is in the range of 300 μL/min to 1000 μL/min. The spray chamber is also able to separate out larger droplets created in the nebulisation process, the efficiency of such separation depending on the particular spray chamber design. This is relevant for both aqueous and organic based samples.

It is generally desirable to separate larger droplets from the aerosolised stream, thus enabling a smoother introduction of the sample into the plasma by virtue of a more consistent droplet size and hence provision of a more homogenous mix of the nebulised sample. It should also be noted that ICP-MS systems which use interface cones, with small machined orifices (between 250 and 1000 μm diameter) between the plasma and mass analyser to support a hard vacuum in the mass analyser chamber, can be prone to blocking when samples containing high (>0.1% wt/wt) total dissolved solids are nebulised.

Spray chambers can only provide specific performance characteristics to adjust for transport efficiency and droplet size rejection based upon the particular design of the spray chamber system. In situations where sample matrix complexity or sensitivity requirements vary, multiple spray chamber designs may be needed or significant compromises in analytical performance are to be expected such as short-term precision, matrix effects, spectral interferences and long-term stability. In light of this, spray chamber systems used in ICP-MS and ICP-OES include single pass spray chambers, double pass spray chambers and cyclonic spray chambers.

One example of a prior art spray chamber is disclosed in US patent application no. 2017/0338092 A1. This disclosure is primarily concerned with reducing deposition of droplets on surfaces of one or more parts of the spray chamber assembly. This reduction can be achieved by injecting a tangential flow of makeup gas into the spray chamber via inlet ports formed in the spray chamber. This flow of gas, in combination with a structural arrangement of microchannels formed within the spray chamber, can help shield the chamber and the surfaces of an inner tube disposed within the chamber, from droplet formation.

The present invention seeks to address at least in part one or more disadvantages of the prior art, or to provide an alternative approach.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect, the present invention provides a flow control device for aerosolised sample delivery in an inductively coupled plasma (ICP) analytical system, the device including:

a body that at least in part defines a sample flow separating region, the sample flow separating region having a longitudinal flow direction and having an upstream end through which the aerosolised sample enters and a downstream end through which a modified aerosolised sample exits, the body including an injection duct having an opening adjacent to the sample flow separating region, the injection duct configured to direct a stream of gas in an injection direction to the sample flow separating region, the injection direction angled relative to the longitudinal flow direction such that, upon introduction of the stream of gas through the opening, a vortex flow is generated in the sample flow separating region, the vortex flow having a direction counter to the direction of flow of the aerosolised sample to provide control of droplet size in the modified aerosolised sample.

Advantageously, the flow control device of the present invention can have the effect of reducing the proportion of larger droplets contained in the modified aerosolised sample than would otherwise be carried by the flow towards the plasma. The invention may achieve this effect by retarding the progress or preventing the passage of larger droplets in the aerosolised sample flow, allowing progress of smaller droplets in the modified aerosolised sample flow. The larger droplets can then be removed from the sample flow. Said removal of the larger droplets is aided by the vortex being directed counter to the direction of flow of the aerosolised sample, whereby the larger droplets are directed away from the separating region (e.g. towards a drain) to prevent or reduce restriction or fluctuation of aerosolised flow through the device.

In accordance with the invention, the modified aerosolised sample flow that travels towards the plasma therefore has an increased proportion of relatively smaller droplets, enabling a smoother introduction of the sample into the plasma and a more homogeneous mix of the aerosolised sample reaching the plasma. The flow control device may also have the effect of breaking up larger droplets contained in the aerosolised sample flow (i.e. a secondary nebulising effect), again resulting in the modified aerosolised sample flow having a higher proportion of smaller droplets than would otherwise be the case.

The present invention can thus provide greater control of the composition of the aerosolised sample, as well as the amount of the sample that progresses beyond the separating region (thus directly influencing transport efficiency and the problem of matrix effects). Varying the flow rate (and or other characteristics) of the stream of gas to the sample flow separating region has the effect of varying the proportion of larger droplets that progress in the modified aerosolised sample, and the amount of the aerosolised sample that progresses in the modified aerosolised sample. Thus, the flow control device may effectively provide an aerosol filtration function.

The present invention is particularly suitable for use in inductively coupled plasma mass spectrometry (ICP-MS) and inductively coupled plasma optical emission spectroscopy (ICP-OES). However, it will be appreciated that the present invention may be suitable for use in other applications, in particular analytical systems, in which flow control may be used.

In an embodiment, the device is configured to be disposed between a nebuliser and plasma in the ICP analytical system. Preferably, the device is configured to be disposed between a spray chamber and plasma in the ICP analytical system. In an embodiment, the device is configured to receive a primary aerosolised sample flow from the spray chamber to produce a secondary aerosolised sample flow (i.e. the modified aerosolised sample flow).

In an embodiment, the injection direction is substantially offset from a radial direction of the sample flow separating region, the degree of offset determining the characteristics of the vortex flow.

Preferably, the injection direction is substantially tangential to the sample flow separating region. For a tubular body, for example, the injection duct is therefore disposed at or close to a tangent to an arc of the interior diameter of the body.

Preferably, a component of the injection direction is in the upstream direction of the sample flow, thereby resulting in the generated vortex flow having a direction counter to the direction of flow of the aerosolised sample (i.e. in the upstream direction).

In a preferred form the injection duct generates a gas jet flow into the sample flow separating region. In an embodiment, the injection duct has a reduced diameter portion adjacent the opening, thereby speeding up the stream of gas into said gas jet flow. The generated gas jet flow may be configured to further nebulise larger droplets contained in the aerosolised sample flow into smaller droplets. The generated gas jet flow may be configured to retard the progress or prevent the passage of larger droplets in the aerosolised sample flow. Preferably, the generated gas jet flow is configured to both further nebulise larger droplets contained in the aerosolised sample flow into smaller droplets and to retard the progress or prevent the passage of larger droplets in the aerosolised sample flow. A diameter of the reduced diameter portion may be between 0.1 mm and 0.5 mm. The injection duct may be configured to generate a gas jet flow having a velocity from about 4 m/s to about 320 m/s, or about 4 m/s to about 300 m/s, or about 10 m/s to about 20 m/s to about 240 m/s, or about 10 m/s to about 150 m/s, in the sample flow separating region. In preferred embodiments, the injection duct may be configured to generate a gas jet flow having a velocity from about 4 m/s to about 265 m/s, or about 17 m/s to about 265 m/s, or about 26 m/s to about 66 m/s, in the sample flow separating region.

In an embodiment, the injection duct is angled at between about 70° and about 88°, preferably at between about 75° and about 85° relative to the longitudinal flow direction, for example at about 80°.

In an embodiment, the flow control device is a unitary body adapted for attachment between the nebuliser and plasma in ICP-MS or ICP-OES (e.g. between a spray chamber and torch). In this form, the flow control device can be retrofitted to existing ICP-MS or ICP-OES equipment to assist in controlling the aerosolised sample flow. In an alternative embodiment, the flow control device is part of the ICP-MS or ICP-OES equipment, for example integrated into other parts of the equipment.

Preferably, the flow control device is of generally elongate form. In one embodiment, the body is of substantially tubular form. In an embodiment, the flow control device includes a downstream portion, an upstream portion and an intermediate portion therebetween. The intermediate portion may provide, at least in part, the sample flow separating region.

The upstream portion may be adapted to be connected to an upstream component of the ICP-MS or ICP-OES equipment. For example, the upstream portion may include threading (internal or external) to enable or facilitate connection to the upstream component. Alternatively, the upstream portion is configured to be press fit into engagement with the upstream component. In one embodiment, the upstream portion may be provided in the form of a ball joint adapted to be connected to a socket of the upstream component. The downstream portion may be adapted to be connected to a downstream component of the ICP-MS or ICP-OES equipment. For example, the downstream portion may include threading (internal or external) to enable or facilitate connection to the downstream component. Alternatively, the downstream portion is configured to be press fit into engagement with the downstream component. In one embodiment, the downstream portion may be provided in the form of a ball joint adapted to be connected to a socket of the downstream component. Preferably, a fluid (i.e. gas and liquid) tight seal is established between the flow control device and the upstream and downstream components respectively.

The upstream portion may be adapted to be connected, directly or indirectly, to an outlet of an ICP-MS or ICP-OES spray chamber. The spray chamber may be of any form known in the art, such as a cyclonic spray chamber, single-pass spray chamber, double-pass spray chamber and the like. Thus, in such an embodiment, it will be appreciated that the flow control device has the effect of providing a secondary droplet size separating stage. In this form, the aerosolised sample produced by the nebuliser is subjected first to a first droplet size separating stage by way of the spray chamber, the resulting stream then subjected to a second droplet size separating stage by way of the flow control device of the invention, thereby producing the modified aerosolised stream.

The downstream portion may be adapted to be connected to an inlet of an ICP-MS or ICP-OES torch. The torch thus receives the modified aerosolised sample.

In an embodiment, the intermediate portion includes a collar portion projecting radially outwardly, wherein the injection duct extends through the collar. Preferably, the injection duct extends through a side wall of the collar portion. The collar portion is preferably of generally annular form with a truncated side, said truncated side forming said side wall through which the injection duct extends. The truncated side preferably has an angled planar facet, with the injection duct extending substantially perpendicular to the planar facet.

Preferably, the flow control device is configured to be oriented substantially vertically, with an upward sample flow direction, during use in an ICP-MS or ICP-OES system. In such a configuration, larger droplets retarded or removed by the generated vortex flow are directed back upstream with the assistance of gravity towards a drain, e.g. a drain tube of an ICP-MS or ICP-OES spray chamber. In an alternative embodiment, the flow control device is configured to be oriented generally substantially horizontally during use in an ICP-MS or ICP-OES system. In such an embodiment, the flow control device may have a dedicated drain for removing larger droplets retarded or removed by the generated vortex flow.

Control of the composition of the aerosolised sample flow can also be effected by varying the dimensions of the injection duct or the opening. Thus, for a given flow rate of the stream of gas, an optimal opening size can be determined or, in the alternative, for a given opening size, an optimal flow rate of the stream of gas can be determined. The present invention can thus provide greater control of the composition of the aerosolised sample flow. Varying the flow rate (and or other characteristics) of the stream of gas to the sample flow separating region has the effect of varying the proportion of larger droplets that progress in the modified aerosol stream.

In view of the above, in at least one embodiment, a flow rate of the stream of gas and/or the dimensions of the injection duct or the opening can be selected based on a sample to be analysed by an ICP-MS or ICP-OES system. For example, a flow control device of the invention having desired dimensions of the injection duct or opening size may be selected from a kit of like flow control devices having different injection duct or opening dimensions. Alternatively, the opening of the flow control device may be configured to be of variable size, thereby enabling selective adjustment of the opening size. In a further alternative embodiment, the flow control device is provided with a plurality of injection ducts each having different dimensions or opening size, wherein the openings that are not being used can be closed.

Preferably, the modified aerosolised sample flow will substantially comprise droplets of less than about 5-6 μm. For example, about 50 to 90% of the modified aerosolised sample flow will comprise droplets of less than 5 μm.

In a second aspect, the present invention provides an inductively coupled plasma (ICP) analytical system, the ICP system including the flow control device of the first aspect of the invention.

The ICP system may be an inductively coupled plasma mass spectrometry system (ICP-MS) or an inductively coupled plasma optical emission spectroscopy system (ICP-OES).

In an embodiment, the system includes a gas source configured to provide the stream of gas to the sample flow separating region. The stream of gas may be argon gas. Other suitable gases include helium, nitrogen, oxygen, and other organic and/or inert gases. In some cases, using oxygen may be advantageous in reducing the build-up of carbon on the device or on other components of the ICP system.

Preferably, the system includes a controller configured to adjust a flow rate of the stream of gas from the gas source.

It will be appreciated that features disclosed with respect to the first aspect of the invention are also applicable with respect to the second aspect of the invention described above, including different combinations of features disclosed.

In a third aspect, the present invention provides a mass spectrometry or spectroscopy system including the flow control device of the first aspect of the invention.

It will be appreciated that features disclosed with respect to the first and second aspect of the invention are also applicable with respect to the third aspect of the invention described above, including different combinations of features disclosed.

In a fourth aspect, the present invention provides a method of removing larger droplets from an aerosolised sample in an analytical system (such as an inductively coupled plasma (ICP) system), the method including:

- providing an aerosolised sample flow to a sample flow separating region having a longitudinal flow direction;
- introducing a gas jet flow into the sample flow separating region to form a vortex flow having a direction counter to the direction of flow of the aerosolised sample to provide control of droplet size such that a modified aerosolised sample exits the sample flow separating region.

In an embodiment, the method further includes generating the aerosolised sample flow by passing a sample through a nebuliser.

Preferably, the aerosolised sample flow provided to the sample flow separating region is received from the outlet of a spray chamber of the ICP system.

Preferably, the method further includes subjecting the aerosolised sample flow to a droplet separating process before providing the aerosolised sample flow to the sample flow separating region. Said subjecting the aerosolised sample flow to a droplet separating process is preferably undertaken at a spray chamber.

In an embodiment, the method further includes nebulising, with the gas jet flow, the aerosolised sample flow at the sample flow separating region.

In an embodiment, the method further includes conveying the modified aerosolised sample to an ICP torch.

In an embodiment, the method is used in inductively coupled plasma mass spectrometry (ICP-MS). In a different embodiment, the method is used in inductively coupled plasma optical emission spectrometry (ICP-OES).

It will be appreciated that features disclosed with respect to the first, second and third aspects of the invention are also applicable with respect to the fourth aspect of the invention described above, including different combinations of features disclosed.

In a fifth aspect, the present invention provides a method of preparing an analytical system (such as an inductively coupled plasma (ICP) system) for removing larger droplets from an aerosolised sample, the method including:

- installing the flow control device of the first aspect in the analytical system between a spray chamber and an ICP torch, wherein the flow control device is configured to receive the aerosolised sample flow from the spray chamber at an upstream portion of the flow control device, and wherein the flow control device is configured to discharge the modified aerosolised sample towards the ICP torch from a downstream portion of the flow control device.

It will be appreciated that features disclosed with respect to the first, second, third and fourth aspects of the invention are also applicable with respect to the fifth aspect of the invention described above, including different combinations of features disclosed.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

The inventors have developed a flow control device, in particular a droplet separation device for addressing some of the inefficiencies of existing inductively coupled plasma (ICP) analytical systems. It will be understood that the droplet separation device herein described can also be used in other flow control applications, particularly analytical systems. An inductively coupled plasma mass spectrometry (ICP-MS) application of the droplet separation device will be described below, but it will be readily apparent to a person skilled in the art that such device can be used in other applications.

Figure 1:
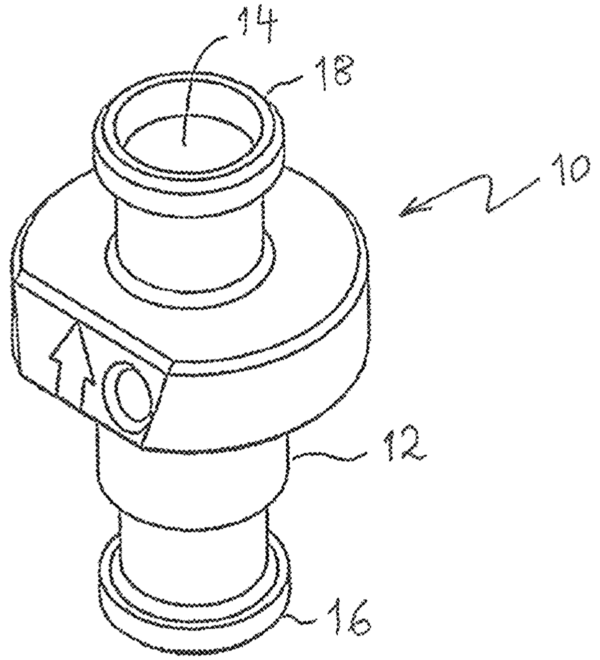
FIG. 1 is a perspective view of a droplet separation device in accordance with an embodiment of the present invention.
Figure 2:
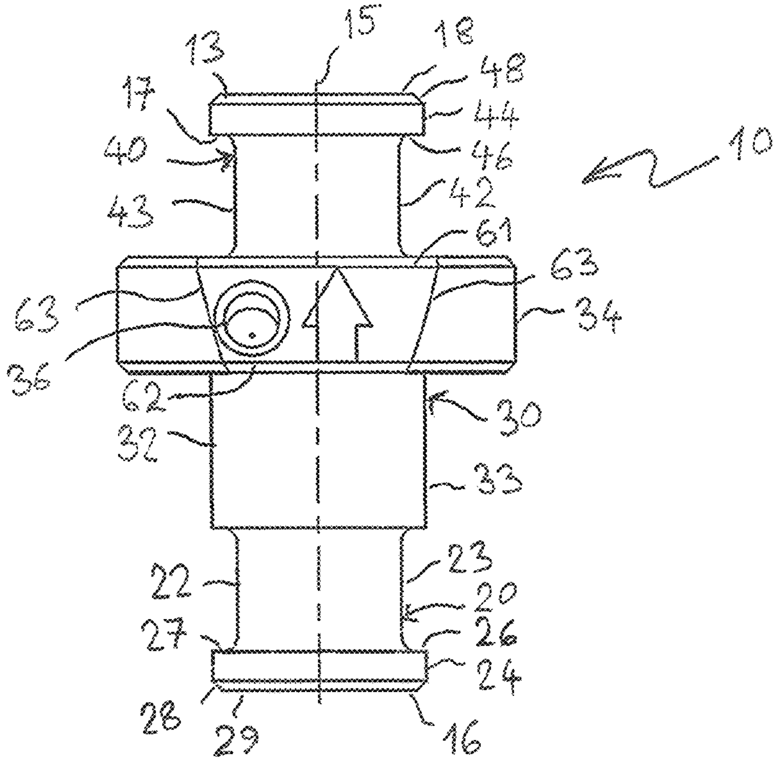
FIG. 2 is a front view of the droplet separation device of FIG. 1.

Reference is made to FIGS. 1 and 2, which illustrate a droplet separation device 10 for an ICP-MS application in accordance with an embodiment of the present invention. Droplet separation device 10 is in the form of an adaptor configured to be arranged between a nebuliser and plasma in an ICP-MS system, with its primary function to reduce the proportion of relatively larger droplets (greater than about 5-10 μm) in an aerosolised sample stream that enters the plasma. Device 10 therefore effectively provide an aerosol filtration function.

Device 10 includes an elongate body 12 of substantially tubular form, in this example formed from a polytetrafluoroethylene (PTFE) material, extending between a first end 16 and a second end 18. The interior 14 of tubular body 12 is oriented along a longitudinal axis 15 of tubular body 12, extending between the first end 16 and the second end 18, thereby providing passage for an aerosolised sample stream through device 10. The tubular body 12 generally comprises an upstream portion 20 adjacent the first end 16, a downstream portion 40 adjacent the second end 18, and an intermediate portion 30 that extends between the upstream portion 20 and downstream portion 40. The references to "downstream" and "upstream" in this context relate to the direction of flow of the aerosolised sample stream through device 10 when it is arranged in an ICP-MS system.

Figure 3:
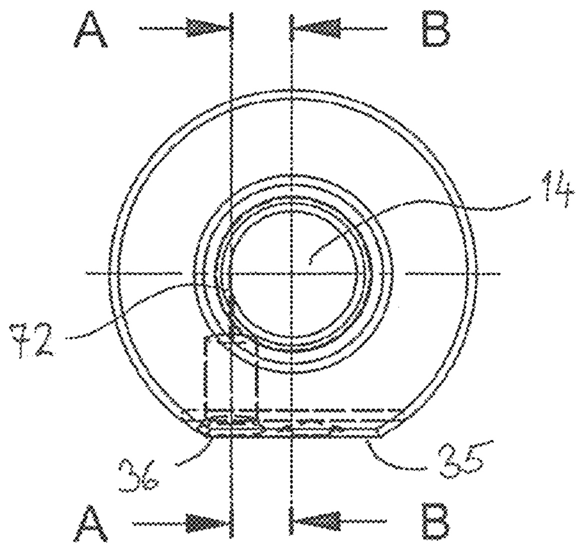
FIG. 3 is a top view of the droplet separation device of FIG. 1, with broken lines depicting hidden internal geometry.
Figure 4:
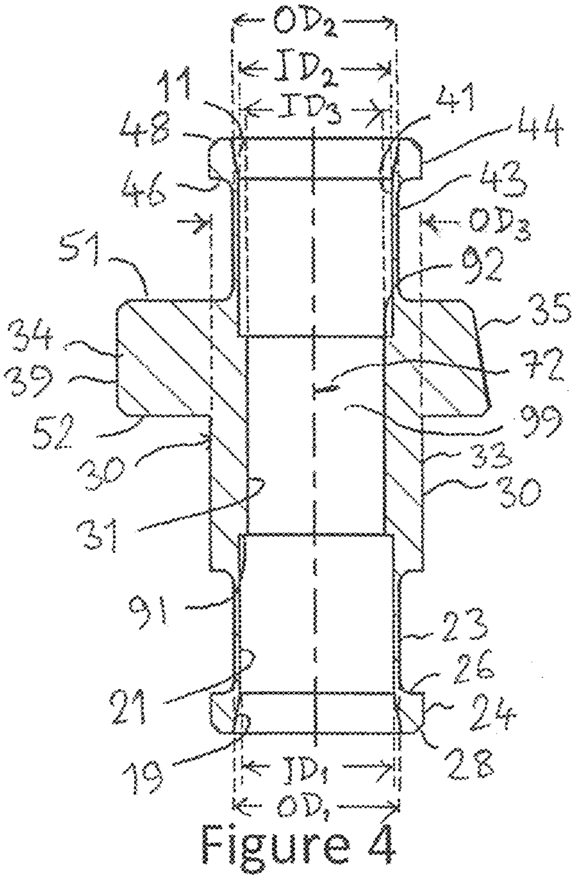
FIG. 4 is a cross-sectional view of the droplet separation device taken along line B-B of FIG. 3.
Figure 5:
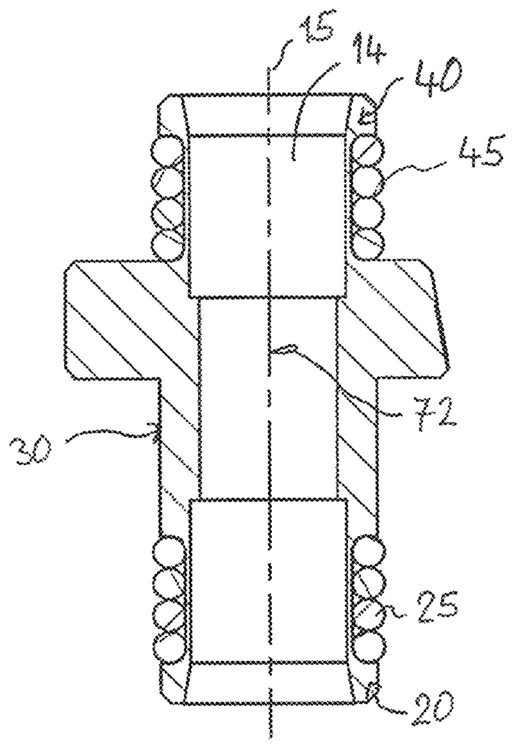
FIG. 5 is a cross-sectional view of the droplet separation device of FIG. 4 showing the location of O-rings positioned about the droplet separation device.

With reference also to FIGS. 3 and 4, the upstream portion 20 includes a first tubular portion 22 having an inner side wall 21 with a first inner diameter $ID_1$ and an outer side wall 23 with a first outer diameter $OD_1$. A circumferential flange 24 extends radially from first tubular portion 22 at first end 16. An inner side surface 27 of flange 24 defines a shoulder 26, said shoulder 26 transitioning smoothly towards side wall 23. Flange 24 further includes a chamfer 28 on an outer side surface 29 of the flange 24. Side wall 23 is adapted to receive O-rings 25 (FIG. 5), which are generally constrained from moving axially along side wall 23 between shoulder 26 and intermediate portion 40. Flange 24 further includes an inner wall 19, which tapers inwardly towards inner side wall 21 such that the widest internal dimension of upstream portion 20 is presented at first end 16.

The upstream portion 20 is adapted for sealing connection with an upstream component of the ICP-MS system. In one example, upstream portion 20 may be connected to a conduit or other outlet component directly downstream of a spray chamber of the ICP-MS system. Chamfer 28 assists in sliding the upstream portion 20 into engagement with the upstream component, while O-rings 25 compress the relatively thin side wall 23 to assist in forming a fluid tight seal between device 10 and the upstream component.

It will be appreciated that in the above example the device 10 is disposed downstream of the spray chamber. In such an arrangement, the device 10 provides a second stage of droplet separation after the initial droplet separation that is conventionally conducted at the spray chamber. However, it is also envisaged that device 10 can instead be disposed immediately downstream of the nebuliser in the ICP-MS system. In such an arrangement, the device 10 can act as a first stage (or only stage) of droplet separation. Further, in the above example the upstream portion 20 engages the upstream component by press fitting the upstream portion 20 inside the upstream component. It will be appreciated that upstream portion 20 can be configured to enable the reverse engagement with the upstream component, i.e. the upstream component being slid into the interior 14 of tubular body 12. To this end, tapering inner wall 19 will assist in allowing the upstream component to slide into tubular body 12.

Downstream portion 40 is of very similar configuration to upstream portion 20. The downstream portion 40 includes a second tubular portion 42 having an inner side wall 41 with a second inner diameter $ID_2$ and an outer side wall 43 with a second outer diameter $OD_2$. In the present embodiment, second outer diameter $OD_2$ is of substantially the same dimension as first outer diameter $OD_1$ and second inner diameter $ID_2$ is of substantially the same dimension as first inner diameter $ID_1$. A circumferential flange 44 extends radially from second tubular portion 42 at second end 18. An inner side surface 17 of flange 44 defines a shoulder 46, said shoulder 46 transitioning smoothly towards side wall 43. Flange 44 further includes a chamfer 48 on an outer side surface 13 of the flange 44. Side wall 43 is adapted to receive O-rings 45 (FIG. 5), which are generally constrained from moving axially along side wall 43 between shoulder 46 and intermediate portion 40. Flange 44 further includes an inner wall 11, which tapers inwardly towards inner side wall 41 such that the widest internal dimension of downstream portion 40 is presented at second end 18

The downstream portion 40 is adapted for sealing connection with a downstream component of the ICP-MS system. In one example, downstream portion 40 may be connected to a conduit or other outlet component directly upstream of a torch of the ICP-MS system (e.g. the sample injector of the plasma torch). Chamfer 48 assists in sliding the downstream portion 40 into engagement with the downstream component, while O-rings 45 compress the relatively thin side wall 43 to assist in forming a fluid tight seal between device 10 and the downstream component.

It will be appreciated that in the above example the downstream portion 40 engages the downstream component by press fitting the downstream portion 40 inside the downstream component. However, the downstream portion 40 can be configured to enable the reverse engagement with the downstream component, i.e. the downstream component being slid into the interior 14 of tubular body 12. To this end, tapering inner wall 11 will assist in allowing the downstream component to slide into tubular body 12.

Intermediate portion 30 includes a third tubular portion 32 having an inner side wall 31 with a third inner diameter $ID_3$ and an outer side wall 33 with a third outer diameter $OD_3$. In the present embodiment, third outer diameter $OD_3$ is greater in dimension than first outer diameter $OD_1$ and third inner diameter $ID_3$ is smaller in dimension than the first inner diameter $ID_1$. As shown in FIG. 4, it will be appreciated that the interior 14 of tubular body 12 does not have a continuous inner diameter along the whole length of the tubular body. Instead, tubular body 12 has first inner diameter $ID_1$ along a length generally extending from first end 16 and terminating at a neck 91 that is situated on an inner side of intermediate portion 30, second inner diameter $ID_2$ along a length generally extending from second end 18 and terminating at a neck 92 that is situated on an inner side of intermediate portion 30, and third inner diameter $ID_3$ along a length extending from neck 91 and terminating at neck 92.

A collar portion 34 extends radially from a downstream end of third tubular portion 32. Collar portion 34 is of substantially annulus shape having a substantially planar outer wall 51, an opposed substantially planar inner wall 52, and an outer side wall 39 that extends between the outer wall 51 an inner wall 52 and is oriented substantially parallel to longitudinal axis 15 except for a truncated outer side wall portion 35 that tapers inward radially towards outer wall 51 as best shown in FIG. 4. In other words, a planar surface of truncated outer side wall portion 35 is angled relative to the longitudinal axis 15. Truncated outer side wall portion 35 is angled between about 2° and about 20°, and preferably about 10° relative to the longitudinal axis 15. Truncated outer side wall portion 35 is of substantially trapezoidal shape in two dimensions (as best shown in FIG. 2), having an outer edge 61, and opposed inner edge 62 being smaller in dimension than outer edge 61, and two side edges 63, which diverge towards outer edge 61.

Figure 6:
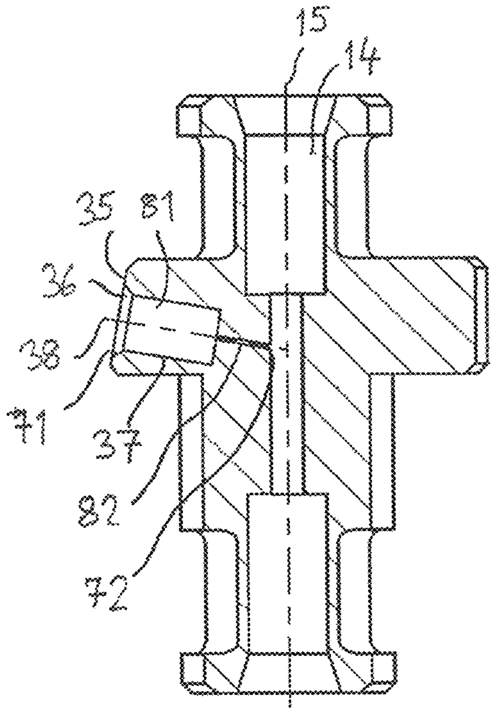
FIG. 6 is a cross-sectional view of the droplet separation device taken along line A-A of FIG. 3.

Referring to FIG. 6, an injection duct 36 extends from truncated outer side wall portion 35, adjacent one of side edges 63, inwardly towards the interior 14 of tubular body 12 and in a direction perpendicular to the planar surface of truncated outer side wall portion 35, whereby a longitudinal axis 38 of injection duct 36 is angled relative to longitudinal axis 15. It will be appreciated that in this configuration, the angle of injection duct 36 relative to the interior 14 of tubular body 12 will be the same as the angle of truncated outer side wall portion 35 (i.e. between about 2° and about 20°). Injection duct 36 defines an open channel 37 having an opening 71 at truncated outer side wall portion 35, a first channel portion 81 extending inwardly from opening 71, a narrower second channel portion 82, which is concentric with first channel portion 81, and terminating with an opening 72 into the interior 14 of tubular body 12. Longitudinal axis 38 defines an injection direction that is substantially tangential to the interior 14 of tubular body 12 (FIG. 3) for reasons that will become apparent below.

In an embodiment, an ICP-MS system includes a source of argon gas that is connected to injection duct 36 via opening 71. Injection duct 36 is configured to direct a gas stream into the interior 14 of tubular body 12 via opening 72. In particular, opening 72 is configured to communicate a jet flow of argon gas into a sample flow separating region 99 of tubular body 12. Due to injection direction being oriented substantially tangential to the interior 14 of tubular body 12 (in particular, substantially tangentially to the sample flow separating region 99), the jet flow of argon gas will enter interior 14 in a manner that promotes the generation of a vortex as the jet flow is forced to navigate around inner side wall 31 of intermediate portion 30. Further, because of the angle between the injection duct 36 and the interior 14 of tubular body 12, the vortex that is generated will be directed against the direction of flow of the aerosolised sample stream, i.e. the vortex will be directed upstream. As will be explained below, the generated vortex is an essential part of producing the desired separation of larger droplets from the aerosolised sample stream once said aerosolised sample stream enters the separating region 99.

The following will describe how device 10 is utilized in an ICP-MS system. In the embodiment herein described, device 10 is a discrete component that can be retrofit to an existing ICP-MS system. Device 10 is connected to an upstream component via engagement with upstream portion 20. In this example, the upstream component is an outlet conduit of a spray chamber of the ICP-MS system. Device 10 is also connected to a downstream component via engagement with downstream portion 40. In this example, the downstream component is a sample injector of a plasma torch of the ICP-MS system. Device 10 is oriented substantially vertically in the ICP-MS system (i.e. as shown in FIGS. 1, 2, and 4 to 6).

In the conventional manner for sample introduction into an ICP-MS system, a liquid sample is introduced into a nebuliser where the liquid is broken up into a fine aerosolised sample stream by the pneumatic action of gas flow smashing the liquid into fine droplets. At this stage the droplets will generally vary greatly in size, typically between about 3 μm and about 120 μm. This aerosolised sample stream travels through to the spray chamber where, depending on the type of spray chamber used, larger droplets are separated from the aerosolised sample stream, resulting in an aerosolised sample stream having a reduced proportion of larger droplets. At this stage the smaller droplets remaining in the aerosolised stream will typically between about 3 μm and about 15 μm. The larger droplets are conventionally removed from the spray chamber under the action of gravity via a drain tube positioned at a lower end of the spray chamber.

Figure 7:
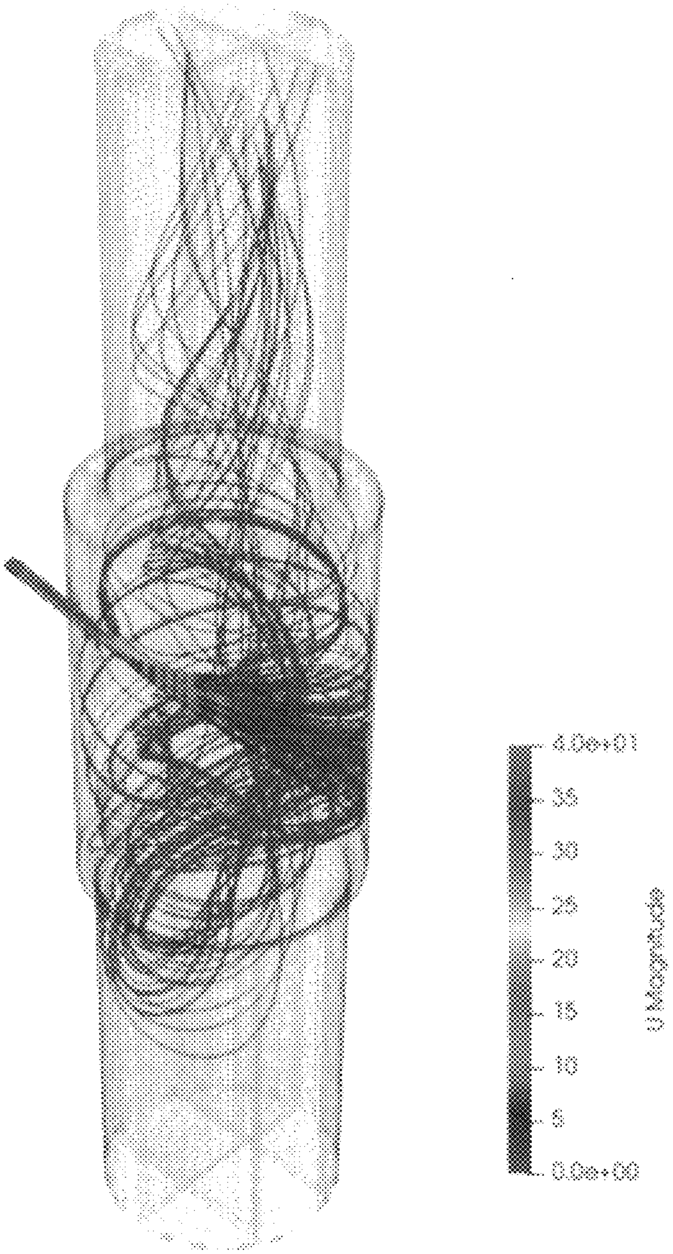
FIG. 7 is a computational fluid dynamic model of the droplet separation device of FIG. 1 when employed in an ICP-MS system.
Figure 8:
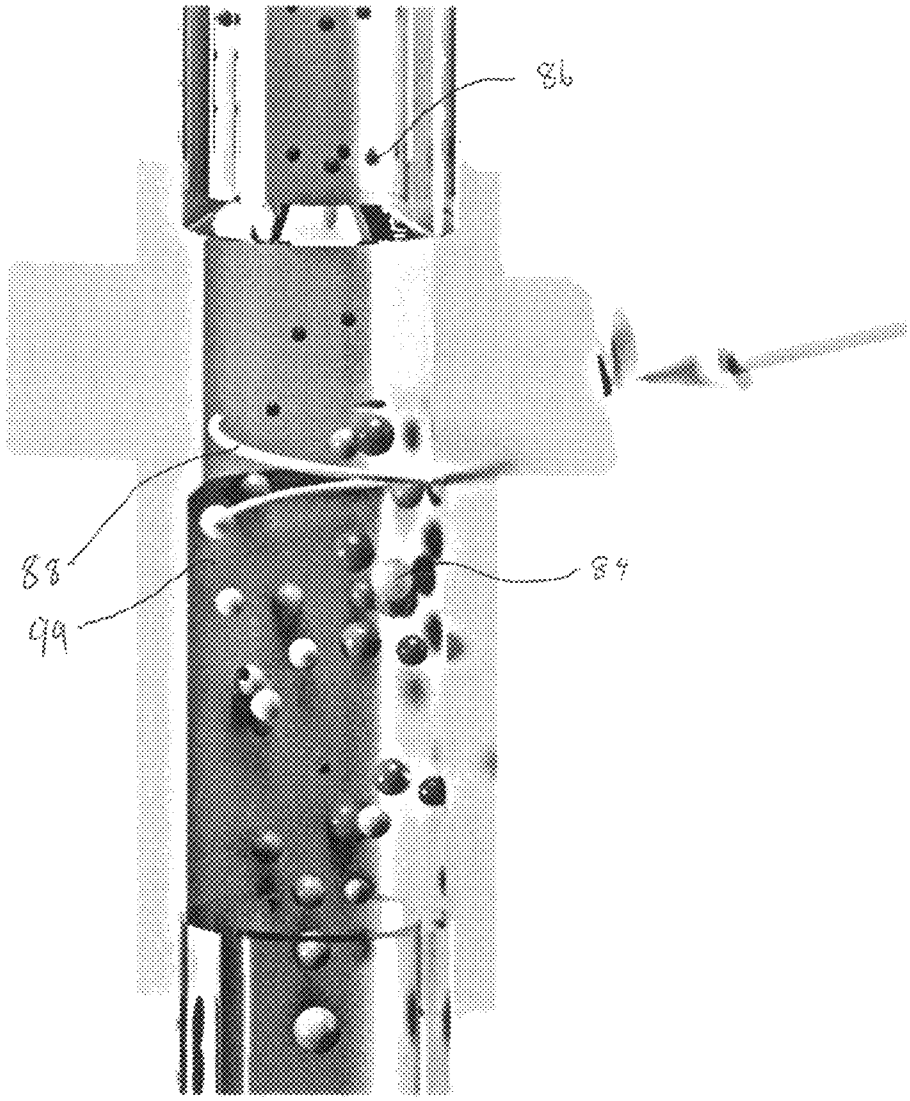
FIG. 8 is a side cross-sectional view of the droplet separation device of FIG. 1 when employed in an ICP-MS system having an aerosolised stream moving therethrough.
Figure 9:
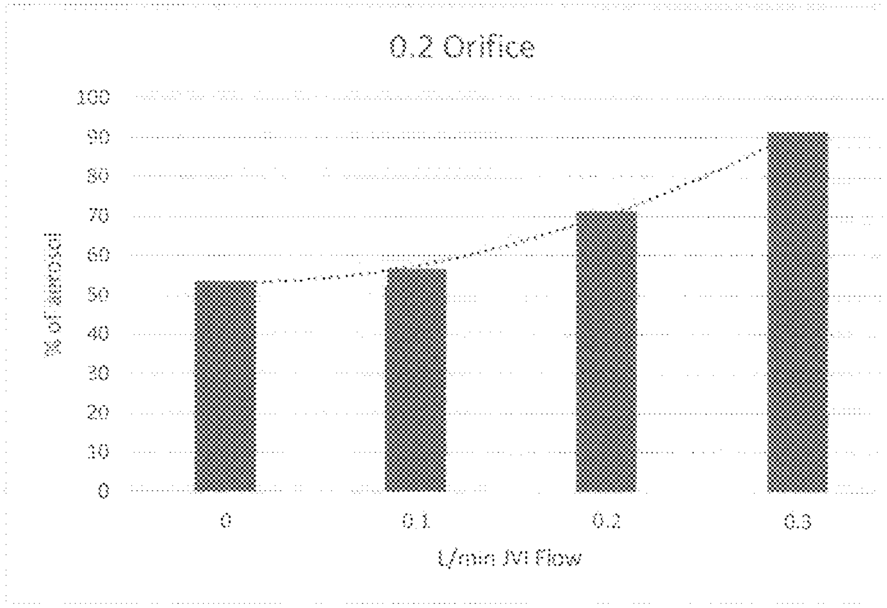
FIGS. 9-12 illustrate results of various tests conducted using the droplet separation device of FIG. 1, whereby the graphs illustrate the percentage of droplets with diameter less than 5 μm in the modified aerosolised stream (after travelling through the droplet separation device) against the flow rate of a gas stream through the droplet separation device for a given opening size of the droplet separation device.
Figure 10:
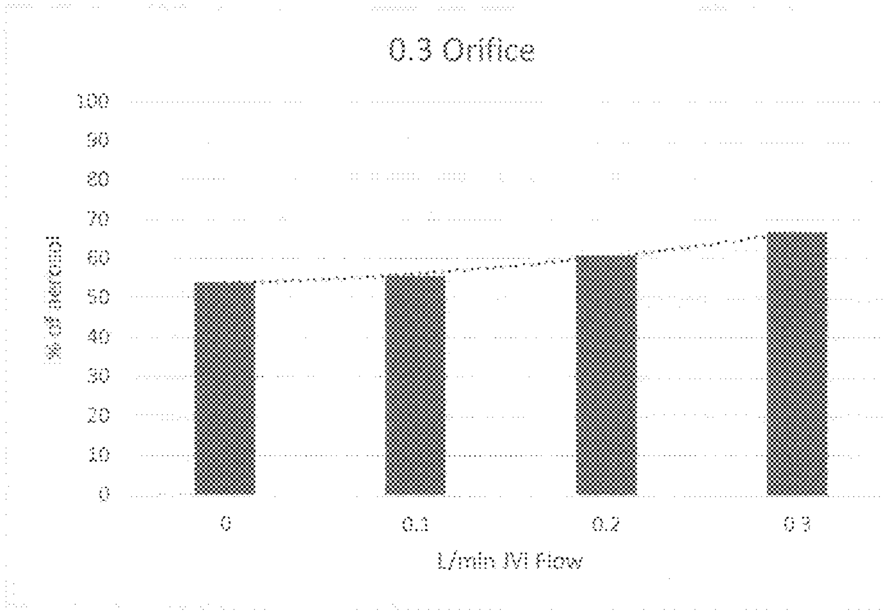
Figure 11:
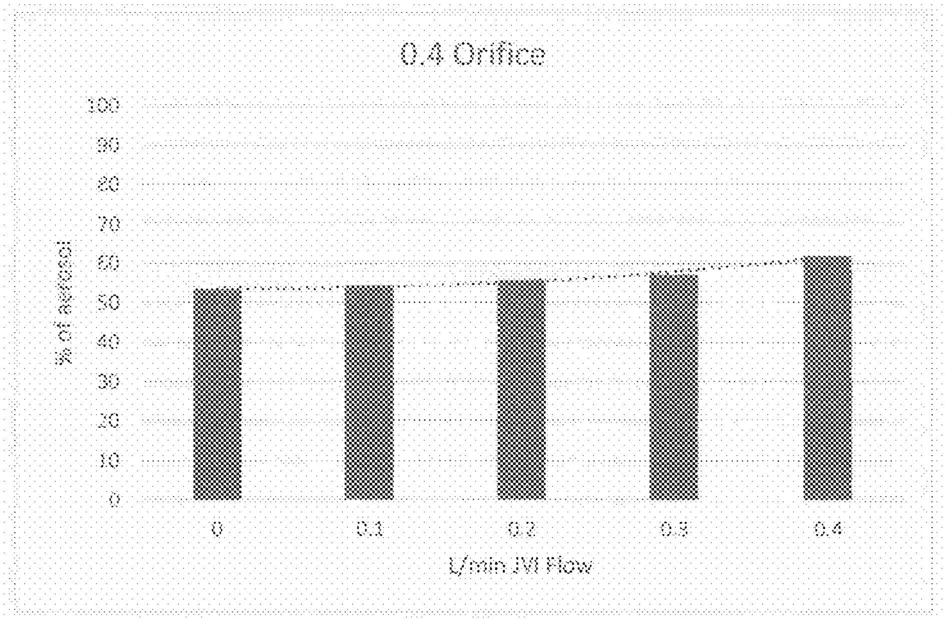
Figure 12:
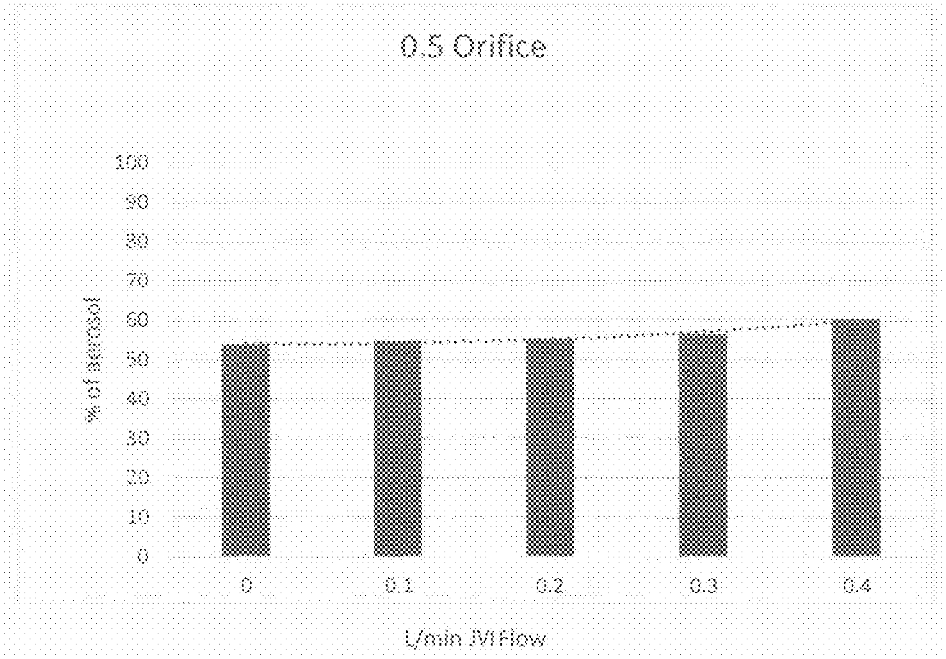

The aerosolised sample stream now travels to device 10, entering the interior 14 of tubular body 12 at first end 16. A source of argon gas operatively coupled to device 10 via injection duct 36 communicates a continuous stream of argon gas into injection duct 36 via opening 71 and a continuous jet flow of argon gas is injected into separating region 99 via opening 72. As mentioned previously, due to the injection direction being oriented substantially tangential to the interior 14 of tubular body 12 and due to the angle between the inlet port 36 and the interior 14 of tubular body 12, the jet flow of argon gas will enter separating region 99 and generate a vortex directed against the direction of flow of the aerosolised sample stream. FIG. 7 shows a computational fluid dynamic model of this effect. Thus, as the aerosolised sample stream enters device 10 and travels towards separating region 99, the aerosolised sample stream will encounter the upstream directed vortex 88 (FIG. 8).

As a result of this encounter, progress of the relatively larger droplets 84 contained in the aerosolised sample stream will be retarded or the larger droplets 84 will be removed, but relatively smaller droplets 86 will generally be allowed to progress. The inventors hypothesise that the reason the generated vortex may retard progress of the larger droplets is due to the vortex creating a pressure zone in separating region 99 that disproportionally disrupts the momentum of the larger droplets relative to the smaller droplets. Further, the inventors hypothesise that that jet stream of argon gas, particularly owing to the velocity of the jet stream, contributes to further nebulisation (i.e. break up) of the larger droplets into smaller droplets. The larger droplets are removed with the assistance of the upstream directed vortex, which directs the larger particles back towards the spray chamber for draining (as previously described). Removal of the larger droplets in this manner helps prevent or reduce restriction or fluctuation of aerosolised flow through the device 10.

As a result of the work of the vortex, the relatively smaller droplets will travel beyond separating region 99 and exit the device 10 from the second end 18. This further modified aerosolised sample stream will then travel through the sample injector of the plasma torch and ultimately through to the plasma. It has been found that this modified aerosolised sample stream will include a greater proportion of smaller droplets that are generally between about 3 μm and about 5 μm in size.

There are various factors that influence the proportion of smaller droplets (e.g. <5 μm) that remain in the modified aerosolised sample stream once the aerosolised sample stream leaves device 10. One of these factors is the flow rate of the gas stream introduced into device 10 via injection duct 36 (i.e. the flow rate of the gas stream from the gas source). Another of these factors is the size of opening 72, which will influence the velocity of the jet flow of gas (i.e. the reduction in the size of opening 72 relative to opening 71 will increase the velocity of the jet flow of gas).

Reference is made to FIGS. 9 to 12, that depict the results of various tests conducted using device 10. The graphs illustrate the percentage of droplets with diameter less than 5 μm in the modified aerosolised sample stream (after travelling through device 10) against the flow rate of the gas stream from the gas source for a given size of opening 72. The flow rate of the gas stream from the gas source is varied in increments of 0.1 L/min between 0 L/min and 0.3 or 0.4 L/min for a given size of opening 72, with opening size varied in increments of 0.1 mm between 0.2 mm and 0.5 mm. As will be appreciated from the graphs, increasing the flow rate of the gas stream from the gas source generally resulted in a greater proportion of droplets with less than 5 μm in the modified aerosolised sample stream, i.e. a reduction in the proportion of larger droplets in the aerosolised sample stream. However, the graphs also show that variations in the flow rate of the gas stream from the gas source resulted in a more pronounced reduction in the proportion of larger droplets for a smaller opening size, i.e. at a higher velocity of the jet flow of gas).

Figure 13:
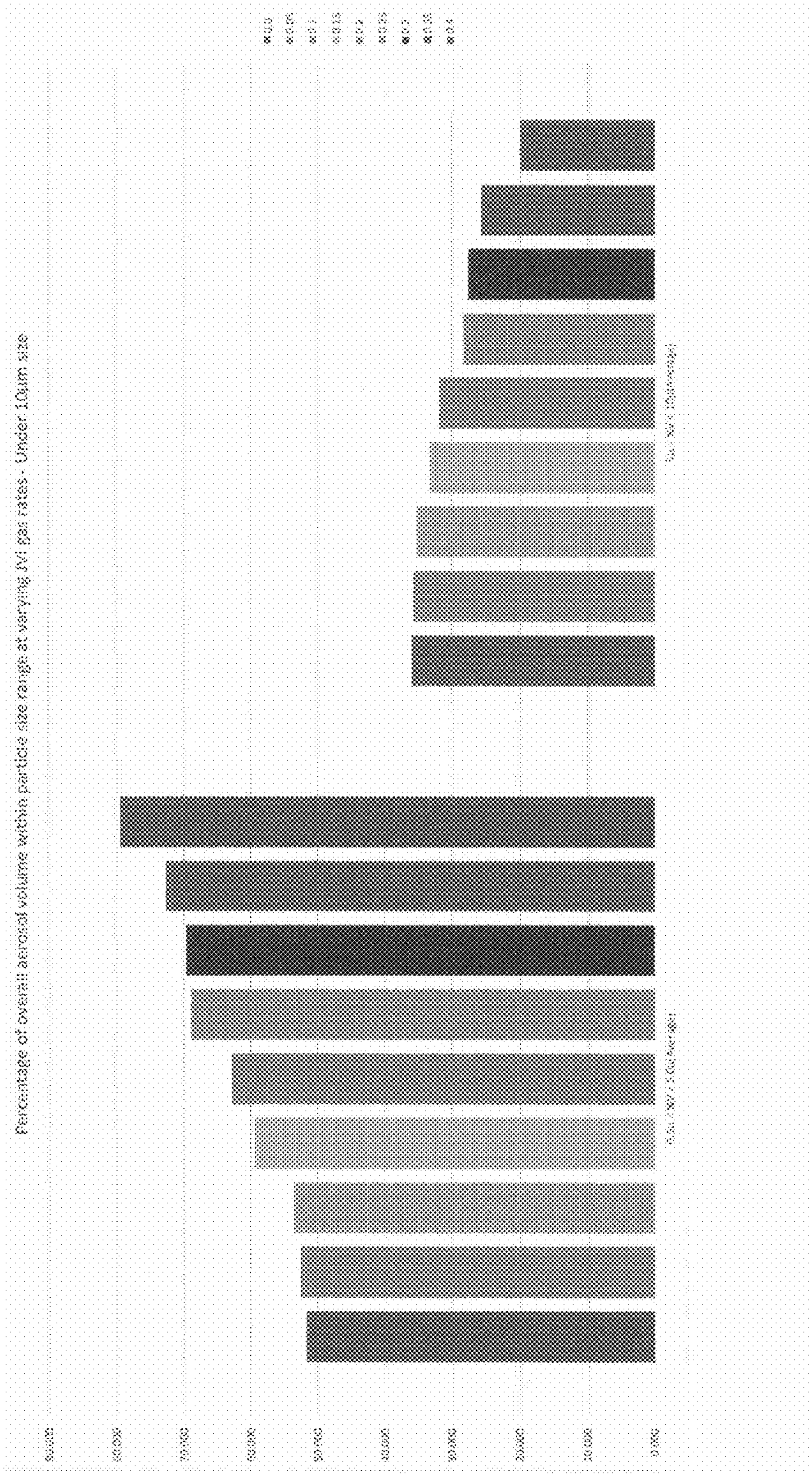
FIG. 13 illustrates results of various tests conducted using the droplet separation device of FIG. 1, whereby the bars on the left of the graph illustrate the percentage of droplets with diameter between 0.5 μm and 5 μm in the modified aerosolised stream (after travelling through the droplet separation device) against the flow rate of a gas stream through the droplet separation device and the bars on the right of the graph illustrate the percentage of droplets with diameter between 5 μm and 10 μm in the modified aerosolised stream (after travelling through the droplet separation device)

FIG. 13 provides a further illustration of the results of various tests conducted using device 10, in particular in bar chart form showing the effect of varying the flow rate of the gas stream on droplet size. The bars on the left of the figure depict proportion of average droplet size between 0.5 μm and 5 μm in the modified aerosolised sample stream for different flow rates, while the bars on the right of the figure depict the corresponding proportion of average droplet size between 5 μm and 10 μm in the modified aerosolised sample stream at each of the different flow rates. As can be clearly seen, increasing flow rate of the gas stream results in an increase in the proportion of smaller droplets in the modified aerosolised sample stream and a corresponding decrease in the proportion of large droplets in the modified aerosolised sample stream.

It will appreciated that the level of droplet separation can therefore be controlled by adjusting the flow rate of the gas stream from the gas source and the size of opening 72 (as well as other variables). Such control of the level of droplet separation, as well as general aerosol filtration, can have a number of advantages. For example, device 10 can be used to control the level of droplet separation and transport efficiency of the aerosolised sample stream on a per sample basis. This can help improve the life of the plasma torch and interface cones, with reduced build-up of droplets on the injector and interface cones of the ICP system (and therefore reduced effects of drift and contamination).

Figure 14:
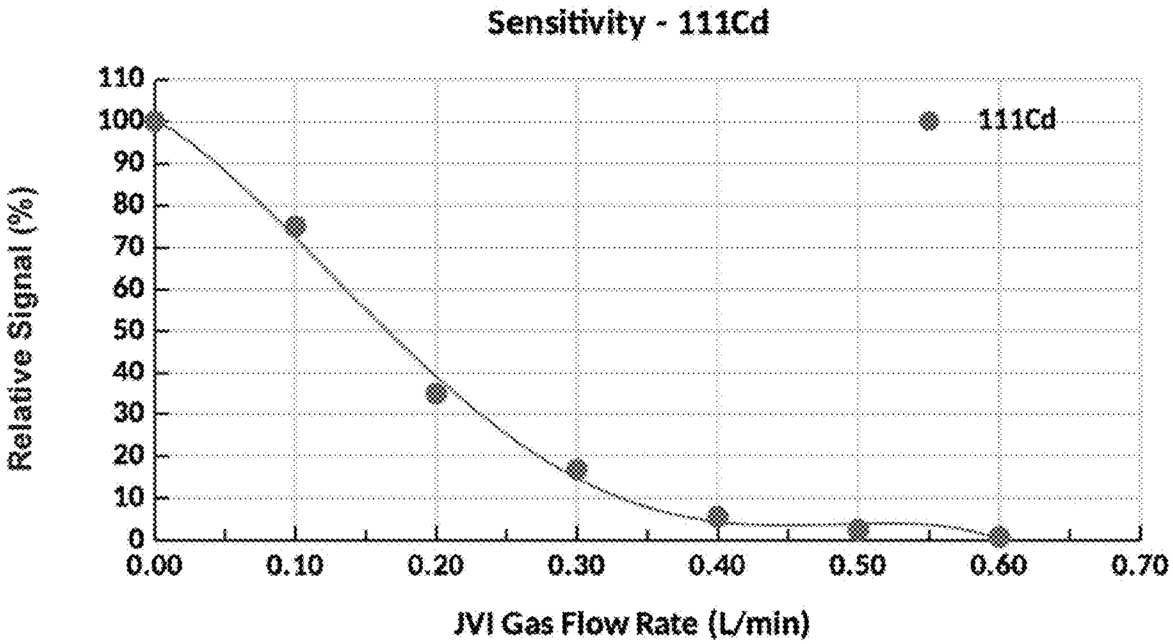
FIG. 14 illustrates results of tests conducted using the droplet separation device of FIG. 1, whereby the graph shows the proportion of droplets that are detected downstream of the device against the flow rate of the gas stream.
Figure 15:
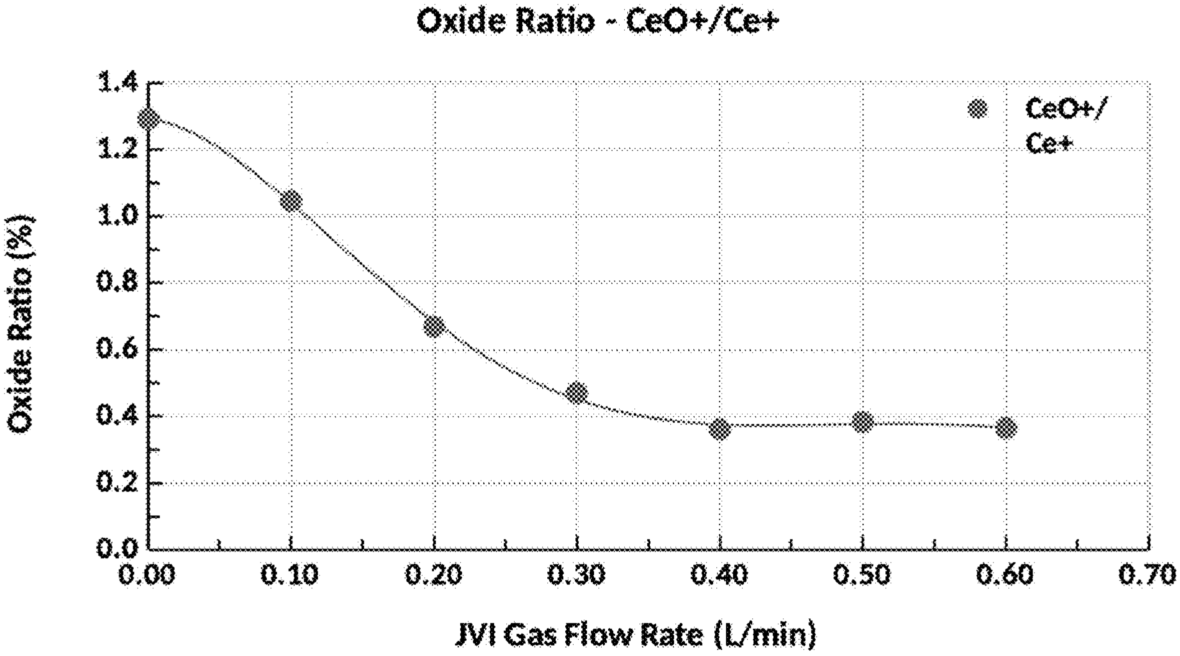
FIG. 15 illustrates results of tests conducted using the droplet separation device of FIG. 1, whereby the graph shows the flow rate of the gas stream against the oxide ratio ($CeO^+/Ce^+$)
Figure 16:
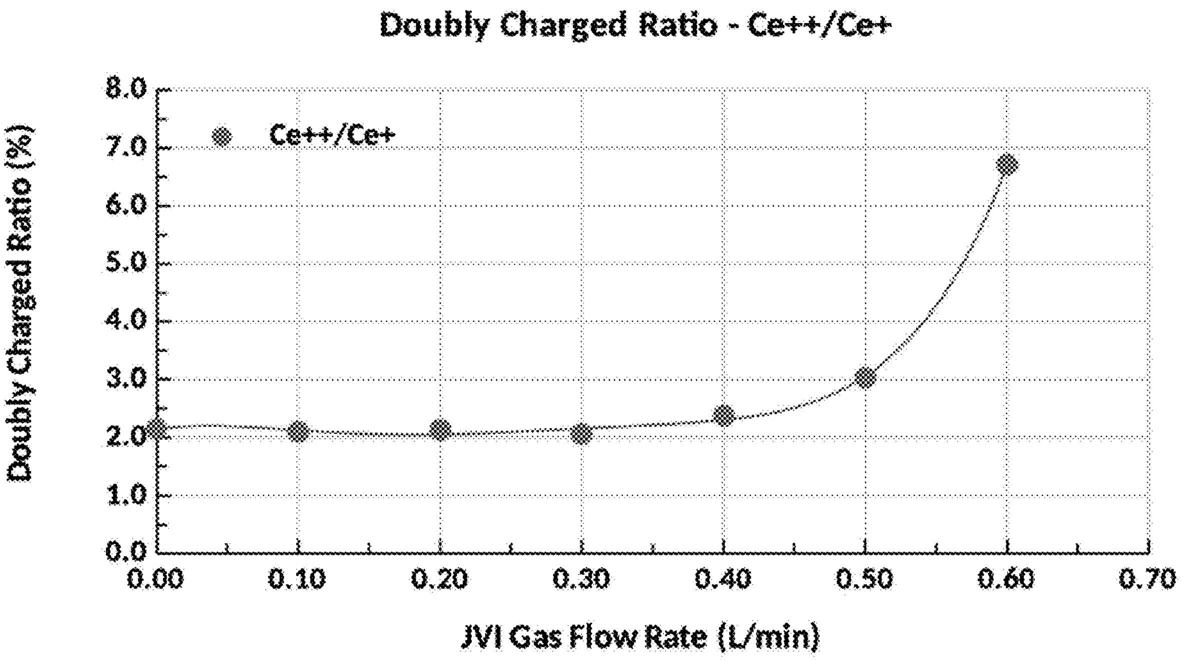
FIG. 16 illustrates results of tests conducted using the droplet separation device of FIG. 1, whereby the graph shows the flow rate of the gas stream against the doubly charged ratio ($Ce^{++}/Ce^+$)

FIGS. 14-16 provide further illustration of the results of various tests conducted using device 10, including tests using a cerium tuning solution. FIG. 14 illustrates the proportion of droplets detected downstream of device 10 against the flow rate of the gas stream from the gas source for a given size of opening 72. In particular, it will be appreciated that device 10 is capable of substantially fully restricting the passage of droplets through flow separating region 99 at certain flow rates by generating gas jet flows of sufficiently high velocity.

FIG. 15 illustrates how increasing the flow rate of the gas stream from the gas source for a given size of opening 72 can reduce the oxide ratio ($CeO^+/Ce^+$) to well below 1%. This creates a more robust plasma, ideal for higher matrix samples. A more robust plasma enables achievement of higher sensitivity, reduced matrix deposition on the interface, thus leading to improved stability and the need for less frequent maintenance of the ICP system.

FIG. 16 illustrates the effect of the flow rate of the gas stream from the gas source on the doubly charged ratio ($Ce^{++}/Ce^+$). Notably, the doubly charged ratio is below 3% for a suitable working range of the device 10, with the flow rate of the gas stream from the gas source exceeding 3% at flow rates above 0.5 L/min. In some applications, it has been found that a flow rate of 0.4 L/min produces the most robust plasma conditions.

Figure 17:
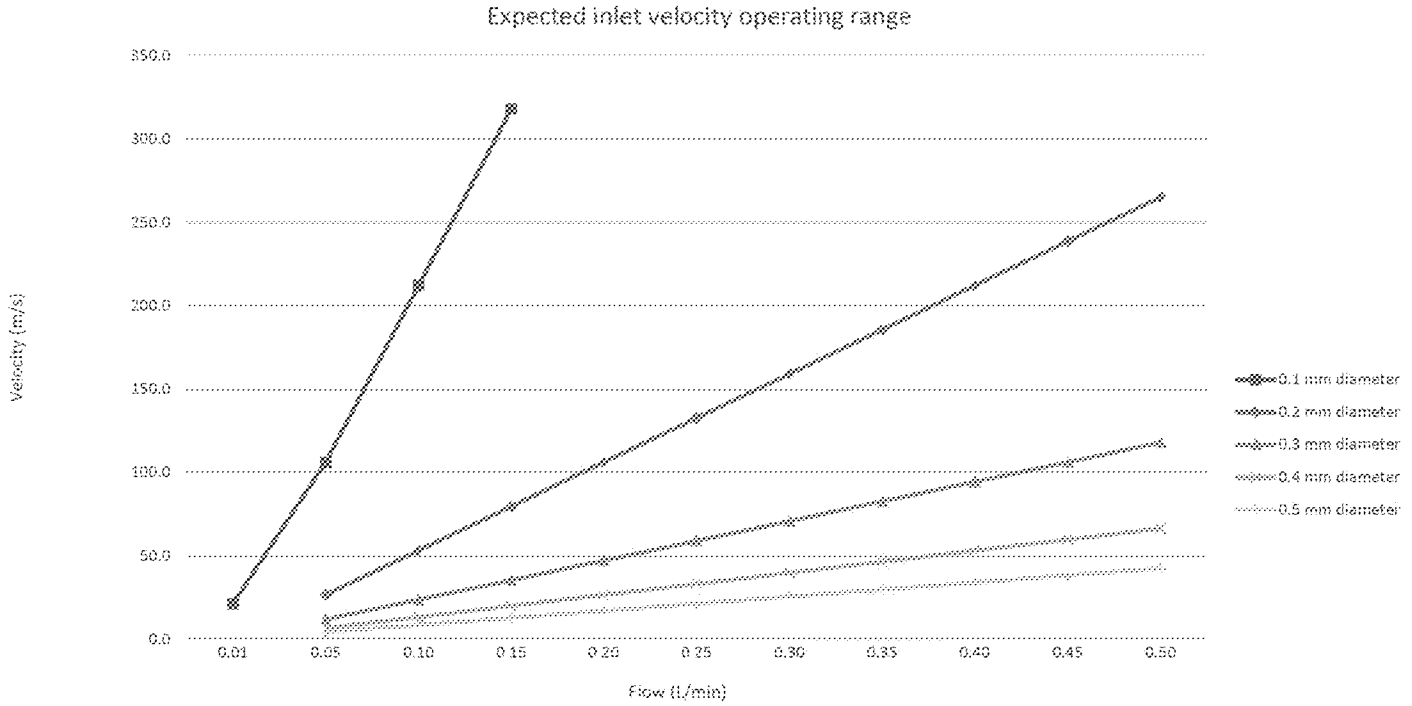
FIG. 17 illustrates results of tests conducted using the droplet separation device of FIG. 1, whereby the graph shows the expected velocity of the gas jet flow against the flow rate of the gas stream for different opening size of the droplet separation device.

FIG. 17 illustrates the expected velocity of the gas jet flow against the flow rate of the gas stream for different size opening 72 of the droplet separation device 10. Notably, FIG. 17 illustrates the heightened velocity of the generated jet flow. As will be appreciated from the discussion above, the high velocity jet flow promotes the generation of a vortex, which helps produce the desired separation of larger droplets from the aerosolised sample stream, as well as the earlier described secondary nebulising effect.

It is envisaged that a user may be provided with a kit of devices 10 with different injection duct configurations and dimensions, the user selecting the appropriate injection duct based on the sample to be analysed. By carefully selecting different variables for different types of samples, greater accuracy in the sample introduction stage can be achieved.

Device 10 can be made of any suitable material that is both inert and chemically resistant to the aerosolised flow. Suitable example materials include PEEK (polyetheretherketone), and PTFE. The O-rings can also be made of any suitable material that is both inert and chemically resistant, such as Viton®.

It will be understood that the invention disclosed and defined in this specification extends to all alternative combinations of two or more of the individual features mentioned or evident from the text or drawings. All of these different combinations constitute various alternative aspects of the invention.

As used herein, except where the context requires otherwise, the term "comprise" and variations of the term, such as "comprising", "comprises" and "comprised", are not intended to exclude further additives, components, integers or steps.

The invention claimed is:

1. A flow control device for aerosolised sample delivery in an inductively coupled plasma (ICP) analytical system, the device including:

a body that at least in part defines a sample flow separating region, the sample flow separating region having a longitudinal flow direction and having an upstream end through which the aerosolised sample enters and a downstream end through which a modified aerosolised sample exits, the body including an injection duct having an opening adjacent to the sample flow separating region, the injection duct configured to direct a stream of gas in an injection direction to the sample flow separating region, the injection direction angled relative to the longitudinal flow direction such that, upon introduction of the stream of gas through the opening, a vortex flow is generated in the sample flow separating region, the vortex flow having a direction counter to the direction of flow of the aerosolised sample to provide control of droplet size in the modified aerosolised sample.

2. The flow control device of claim 1, configured to be disposed between a spray chamber and plasma in the ICP analytical system.

3. The flow control device of claim 1, further configured to receive a primary aerosolised sample flow from the spray chamber and to produce a secondary aerosolised sample flow.

4. The flow control device of claim 1, wherein the injection direction is substantially offset from a radial direction of the sample flow separating region, the degree of offset determining the characteristics of the vortex flow.

5. The flow control device of claim 1, wherein the injection direction is substantially tangential to the sample flow separating region.

6. The flow control device of claim 1, wherein a component of the injection direction is in the upstream direction of the sample flow, thereby resulting in the generated vortex flow having a direction counter to the direction of flow of the aerosolised sample.

7. The flow control device of claim 1, wherein the injection duct generates a gas jet flow into the sample flow separating region.

8. The flow control device of claim 7, wherein the injection duct has a reduced diameter portion adjacent the opening, thereby speeding up the stream of gas into said gas jet flow, wherein the generated gas jet flow is configured to further nebulise larger droplets contained in the aerosolised sample flow into smaller droplets and to retard the progress or prevent the passage of larger droplets in the aerosolised sample flow.

9. The flow control device of claim 1, wherein the injection duct is angled at between about 70° and about 88° relative to the longitudinal flow direction.

10. The flow control device of claim 1, wherein the flow control device is a unitary body adapted for attachment between the spray chamber and plasma in the ICP analytical system.

11. The flow control device of claim 1, wherein the flow control device includes a downstream portion, an upstream portion and an intermediate portion therebetween, wherein the intermediate portion provides, at least in part, the sample flow separating region.

12. The flow control device of claim 11, wherein the upstream portion is adapted to be connected to a spray chamber of the ICP analytical system, and the downstream portion is adapted to be connected to an inlet of a torch of the ICP analytical system.

13. The flow control device of claim 11, wherein the intermediate portion includes a collar portion projecting radially outwardly, wherein the injection duct extends through the collar portion.

14. The flow control device of claim 13, wherein the injection duct extends through a side wall of the collar portion.

15. The flow control device of claim 14, wherein the collar portion is of generally annular form with a truncated side, said truncated side forming said side wall through which the injection duct extends.

16. The flow control device of claim 15, wherein the truncated side has an angled planar facet, with the injection duct extending substantially perpendicular to the planar facet.

17. The flow control device of claim 1, wherein the flow control device is configured to be oriented substantially vertically, with an upward sample flow direction, during use in ICP analytical system, whereby larger droplets retarded or removed by the generated vortex flow are directed back upstream with the assistance of gravity towards a drain.

18. The flow control device of claim 1, wherein a flow rate of the stream of gas and/or the dimensions of the injection duct or the opening is selectable based on a sample to be analysed by the ICP analytical system.

19. The flow control device of claim 1, wherein the modified aerosolised sample flow substantially comprises droplets of less than about 5-6 μm.

20. An inductively coupled plasma (ICP) analytical system, the ICP system including the flow control device of claim 1.

* * * * *